US010648383B2

(12) United States Patent
McCune et al.

(10) Patent No.: US 10,648,383 B2
(45) Date of Patent: *May 12, 2020

(54) PLANETARY GEAR SYSTEM ARRANGEMENT WITH AUXILIARY OIL SYSTEM

(71) Applicant: United Technologies Corporation, Farmington, CT (US)

(72) Inventors: Michael E. McCune, Colchester, CT (US); William G. Sheridan, Southington, CT (US); Lawrence E. Portlock, Bethany, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 392 days.

This patent is subject to a terminal disclaimer.

(21) Appl. No.: 15/621,406

(22) Filed: Jun. 13, 2017

(65) Prior Publication Data
US 2017/0276046 A1 Sep. 28, 2017

Related U.S. Application Data

(60) Division of application No. 14/474,869, filed on Sep. 2, 2014, now Pat. No. 9,556,774, which is a division
(Continued)

(51) Int. Cl.
*F01D 25/16* (2006.01)
*F01N 3/20* (2006.01)
(Continued)

(52) U.S. Cl.
CPC ............ *F01N 3/208* (2013.01); *F01D 25/16* (2013.01); *F01D 25/18* (2013.01); *F01N 3/2066* (2013.01);
(Continued)

(58) Field of Classification Search
CPC ...... F02C 3/10; F02C 7/06; F02C 7/36; F01D 25/16; F01D 25/18; F02K 3/06
See application file for complete search history.

(56) References Cited

U.S. PATENT DOCUMENTS 2,327,859 A   8/1943  Bolsey
2,591,743 A   4/1952  Thompson
(Continued)

FOREIGN PATENT DOCUMENTS

CN   1707070   12/2005
EP   2264336   12/2010
(Continued)

OTHER PUBLICATIONS

International Search Report and Written Opinion for International Application No. PCT/US2013/033207 completed on Jan. 22, 2014.
(Continued)

*Primary Examiner* — Arun Goyal
(74) *Attorney, Agent, or Firm* — Carlson, Gaskey & Olds, P.C.

(57) ABSTRACT

A method of designing a gas turbine engine includes configuring a speed reduction device for driving a fan and configuring a lubrication system for lubricating components across a rotation gap. The lubrication system includes a lubricant input. A stationary first bearing receives lubricant from the lubricant input and has a first race in which lubricant flows. A second bearing for rotation is within the first bearing. The second bearing has a first opening in registration with the first race such that lubricant may flow from the first race through the first opening into a first conduit. The first bearing is configured to also include a second race into which lubricant flows. The second bearing has a second opening in registration with the second race such that lubricant may flow from the second race through (Continued)

the second opening into a second conduit. The first and second conduits deliver lubricant to distinct locations.

6 Claims, 6 Drawing Sheets

Related U.S. Application Data of application No. 14/266,888, filed on May 1, 2014, now Pat. No. 8,931,285, which is a continuation of application No. 13/428,491, filed on Mar. 23, 2012, now Pat. No. 9,995,174, which is a continuation-in-part of application No. 12/902,525, filed on Oct. 12, 2010, now Pat. No. 8,813,469.

(51) Int. Cl.
| | |
|---|---|
| F01D 25/18 | (2006.01) |
| F02C 3/10 | (2006.01) |
| F02K 3/06 | (2006.01) |
| F02C 7/36 | (2006.01) |
| F02C 7/06 | (2006.01) |
| F02C 7/10 | (2006.01) |
| F01N 11/00 | (2006.01) |
| F16N 7/34 | (2006.01) |

(52) U.S. Cl.
CPC .............. *F01N 11/00* (2013.01); *F02C 3/10* (2013.01); *F02C 7/06* (2013.01); *F02C 7/10* (2013.01); *F02C 7/36* (2013.01); *F02K 3/06* (2013.01); *F01N 2610/01* (2013.01); *F01N 2610/02* (2013.01); *F01N 2610/142* (2013.01); *F01N 2610/1406* (2013.01); *F01N 2610/148* (2013.01); *F01N 2900/1814* (2013.01); *F05D 2260/40311* (2013.01); *F16N 7/34* (2013.01); *Y02T 10/24* (2013.01); *Y02T 50/671* (2013.01); *Y10T 29/4932* (2015.01); *Y10T 137/0324* (2015.04); *Y10T 137/7297* (2015.04)

(56) References Cited

U.S. PATENT DOCUMENTS

| | | | |
|---|---|---|---|
| 2,684,591 | A | 7/1954 | Lundquist |
| 2,703,021 | A | 3/1955 | Stoeckicht |
| 2,749,778 | A | 6/1956 | Kuhn |
| 2,830,473 | A | 4/1958 | Brown |
| 2,883,885 | A | 4/1959 | Upton |
| 2,968,922 | A | 1/1961 | Gilbert |
| 3,160,026 | A | 12/1964 | Rosen |
| 3,307,433 | A | 3/1967 | Bennett et al. |
| 3,352,178 | A | 11/1967 | Lindgren et al. |
| 3,459,072 | A | 8/1969 | Shannon |
| 3,650,353 | A | 3/1972 | Abbott |
| 3,754,484 | A | 8/1973 | Roberts |
| 3,776,067 | A | 12/1973 | DeBruyne et al. |
| 3,960,029 | A | 6/1976 | Eichinger |
| 4,050,544 | A | 9/1977 | Kalyan et al. |
| 4,227,427 | A | 10/1980 | Dick |
| 4,271,928 | A | 6/1981 | Northern |
| 4,378,711 | A | 4/1983 | Daniel |
| 4,438,663 | A | 3/1984 | Eichenberger et al. |
| 4,455,888 | A | 6/1984 | Wayman et al. |
| 4,467,670 | A | 8/1984 | Kawamoto |
| 4,528,870 | A | 7/1985 | Van Deursen et al. |
| 4,583,413 | A | 4/1986 | Lack |
| 4,657,410 | A | 4/1987 | Hibner |
| 4,784,018 | A | 11/1988 | Okada et al. |
| 4,950,213 | A | 8/1990 | Morisawa |
| 5,058,452 | A | 10/1991 | El-Shafei |
| 5,102,379 | A | 4/1992 | Pagluica et al. |
| 5,433,674 | A | 7/1995 | Sheridan et al. |
| 5,466,198 | A | 11/1995 | McKibbin et al. |
| 5,472,059 | A | 12/1995 | Schlosser et al. |
| 5,472,383 | A | 12/1995 | McKibbin |
| 5,643,126 | A | 7/1997 | Hotta et al. |
| 5,685,797 | A | 11/1997 | Barnsby et al. |
| 5,830,098 | A | 11/1998 | Kimes |
| 6,223,616 | B1 | 5/2001 | Sheridan |
| 7,704,178 | B2 | 4/2010 | Sheridan et al. |
| 2007/0240399 | A1 | 10/2007 | Orlando et al. |
| 2008/0044276 | A1 | 2/2008 | McCune et al. |
| 2009/0090096 | A1 | 4/2009 | Sheridan |
| 2009/0188334 | A1 | 7/2009 | Merry et al. |
| 2010/0105516 | A1 | 4/2010 | Sheridan et al. |
| 2010/0154217 | A1 | 6/2010 | Sheridan et al. |
| 2010/0160105 | A1 | 6/2010 | Sheridan et al. |
| 2010/0317478 | A1 | 12/2010 | McCune et al. |

FOREIGN PATENT DOCUMENTS

| | | |
|---|---|---|
| EP | 2267338 | 12/2010 |
| EP | 2270361 | 1/2011 |
| EP | 2327859 | 6/2011 |
| EP | 2333250 | 6/2011 |
| JP | S57161326 | 10/1982 |
| JP | 60252857 | 12/1985 |
| JP | 61130656 | 6/1986 |
| JP | 62166365 | 7/1987 |
| JP | 2003056362 | 2/2003 |

OTHER PUBLICATIONS

International Preliminary Report on Patentability for International Application No. PCT/US2013/033207 dated Oct. 2, 2014.

Singapore Search Report and Written Opinion for Singapore Application No. 11201404964X dated Apr. 20, 2015.

Supplementary European Search Report for European Application No. 13817296.0 dated Feb. 12, 2016.

Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.

Johnston, R.P. and Hemsworth, M.G. (1978). Energy efficient engine preliminary design and integration studies. Jun. 1, 1978. pp. 1-28.

Awker, R.W. (1986). Evaluation of propfan propulsion applied to general aviation. NASA CR-175020. Mar. 1, 1986. pp. 1-140.

Howe, D.C. and Wynosky, T.A. (1985). Energy efficient engine program advanced turbofan nacelle definition study. NASA CR-174942. May 1, 1985. pp. 174.

Singh, B. (1986). Small engine component technology (SECT) study. NASA CR-175079. Mar. 1, 1986. pp. 1-102.

Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.

Anderson, R.D. (1985). Advanced Propfan Engine Technology (APET) definition study, single and counter-rotation gearbox/pitch change mechanism design. NASA CR-168115. Jul. 1, 1985. pp. 1-289.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.

Gliebe, P.R., Ho, P.Y., and Mani, R. (1995). UHB engine fan and broadband noise reduction study. NASA CR-198357. Jun. 1995. pp. 1-48.

Holcombe, V. (2003). Aero-Propulsion Technology (APT) task V low noise ADP engine definition study. NASA CR-2003-212521. Oct. 1, 2003. pp. 1-73.

Sutliff, D. (2005). Rotating rake turbofan duct mode measurement system. NASA TM-2005-213828. Oct. 1, 2005. pp. 1-34.

Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

(56) References Cited

OTHER PUBLICATIONS

NASA Conference Publication. (1978). CTOL transport technology. NASA-CP-2036-PT-1. Jun. 1, 1978. pp. 1-531.
Gray, D.E. (1978). Energy efficient engine preliminary design and integration studies. NASA-CP-2036-PT-1. Nov. 1978. pp. 89-110.
Kandebo, S.W. (1998). Pratt & Whitney launches geared turbofan engine. Aviation Week & Space Technology, 148(8). p. 32-4.
Kandebo, S.W. (1998). Geared-Turbofan engine design targets cost, complexity. Aviation Week & Space Technology, 148(8). p. 34-5.
Davis, D.G.M. (1973). Variable-pitch fans: Progress in Britain. Flight International. Apr. 19, 1973. pp. 615-617.
Levintan, R.M. (1975). Q-Fan demonstrator engine. Journal of Aircraft. vol. 12( 8). Aug. 1975. pp. 658-663.
Aerospace Information Report. (2008). Advanced ducted propulsor in-flight thrust determination. SAE International AIR5450. Aug. 2008. p. 1-392.
Technical Report. (1975). Quiet Clean Short-haul Experimental Engine (QCSEE) UTW fan preliminary design. NASA-CR-134842. Feb. 1, 1975. pp. 1-98.
Daggett, D.L., Brown, S.T., and Kawai, R.T. (2003). Ultra-efficient engine diameter study. NASA/CR-2003-212309. May 2003. pp. 1-52.
Technical Report. (1977). Quiet Clean Short-haul Experimental Engine (QCSEE) Under-the-Wing (UTW) final design report. NASA-CR-134847. Jun. 1, 1977. pp. 1-697.

PLANETARY GEAR SYSTEM ARRANGEMENT WITH AUXILIARY OIL SYSTEM

CROSS-REFERENCE TO RELATED APPLICATION

This application is a divisional of United States Ser. No. 14/474,869, filed Sep. 2, 2014 which is now U.S. Pat. No. 9,677,420 granted Jun. 13, 2017, which is a divisional of United States Ser. No. 14/266,888, filed May 1, 2014, which is now U.S. Pat. No. 8,931,285 granted Jan. 13, 2015, which is a continuation of United States Ser. No. 13/428,491, filed Mar. 23, 2012, which is a continuation-in-part application of United States Ser. No. 12/902,525, filed Oct. 12, 2010, which is now U.S. Pat. No. 8,813,469 granted Aug. 26, 2014.

FIELD

This invention relates to planetary gear trains and more particularly to a lubricating system for a planetary gear train.

BACKGROUND

Planetary gear trains are complex mechanisms that reduce, or occasionally increase, the rotational speed between two rotating shafts or rotors. The compactness of planetary gear trains makes them appealing for use in aircraft engines where space is at a premium.

The forces and torque transferred through a planetary gear train place stresses on the gear train components that may make them susceptible to breakage and wear. In practice, conditions may be less than ideal and place additional stresses on the gear components. For example the longitudinal axes of a planetary gear train's sun gear, planet carrier, and ring gear are ideally coaxial with the longitudinal axis of an external shaft that rotates the sun gear. Such perfect coaxial alignment, however, is rare due to numerous factors including imbalances in rotating hardware, manufacturing imperfections, and transient flexure of shafts and support frames due to aircraft maneuvers. The resulting parallel and angular misalignments impose moments and forces on the gear teeth, the bearings which support the planet gears in their carrier, and the carrier itself. These imposed forces and moments may cause gear component wear and increase a likelihood that a component may break in service. Component breakage is undesirable in any application, but particularly so in an aircraft engine. Moreover, component wear necessitates inspections and part replacements which may render the engine and aircraft uneconomical to operate.

The risk of component breakage may be reduced by making the gear train components larger and therefore stronger. Increased size may also reduce wear by distributing the transmitted forces over correspondingly larger surfaces. However increased size offsets the compactness that makes planetary gear trains appealing for use in aircraft engines, and the corresponding weight increase is similarly undesirable. The use of high strength materials and wear resistant coatings can also be beneficial, but escalates the cost of the gear train and therefore does not diminish the desire to reduce wear.

Stresses due to misalignments can also be reduced by the use of flexible couplings to connect the gear train to external devices such as rotating shafts or non-rotating supports. For example, a flexible coupling connecting a sun gear to a drive shaft flexes so that the sun gear remains near its ideal orientation with respect to the mating planet gears even though the axis of the shaft is oblique or displaced with respect to a perfectly aligned orientation. Many prior art couplings, however, contain multiple parts that require lubrication and are themselves susceptible to wear. Prior art couplings may also lack adequate rigidity and strength, with respect to torsion about a longitudinal axis, to be useful in high torque applications.

SUMMARY

In one exemplary embodiment, a method of designing a gas turbine engine includes configuring a speed reduction device for driving a fan and configuring a lubrication system for lubricating components across a rotation gap. The lubrication system includes a lubricant input. A stationary first bearing receives lubricant from the lubricant input and has a first race in which lubricant flows. A second bearing for rotation is within the first bearing. The second bearing has a first opening in registration with the first race such that lubricant may flow from the first race through the first opening into a first conduit. The first bearing is configured to also include a second race into which lubricant flows. The second bearing has a second opening in registration with the second race such that lubricant may flow from the second race through the second opening into a second conduit. The first and second conduits deliver lubricant to distinct locations.

In a further embodiment of the above, the first bearing and the second bearing are centered about a common axis and the first conduit is parallel to the axis and the first opening is perpendicular to the axis.

In a further embodiment of any of the above, the speed reduction device includes a rotating carrier for supporting at least one planetary gear. The second bearing extends from the rotating carrier about an axis.

In a further embodiment of any of the above, the first conduit is parallel to the axis. The first opening is perpendicular to the axis. The first conduit lubricates the planetary gears.

In a further embodiment of any of the above, a first spray bar is disposed on the carrier.

In a further embodiment of any of the above, the speed reduction device includes an epicyclic gear train that has a sun gear. A plurality of planetary gears is configured to rotate about the sun gear. A stationary ring gear and a carrier are attached to the fan.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
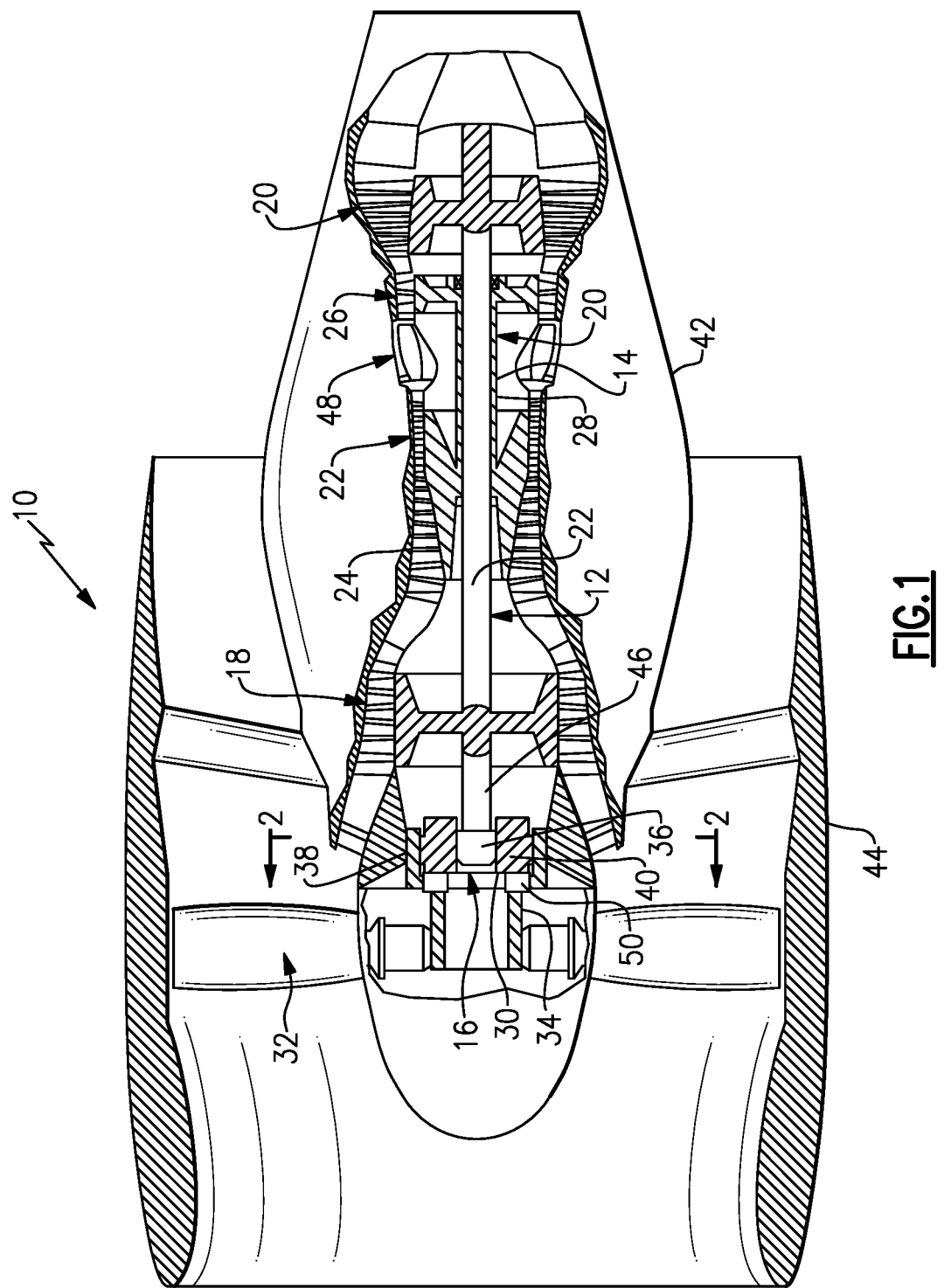
FIG. 1 is a schematic view, partially in section, of a gas turbine engine.

FIG. 1 shows a schematic cross-section of gas turbine engine 10. Gas turbine engine 10 includes low pressure spool 12, high pressure spool 14 and fan drive gear system ("FDGS") 16. Low pressure spool 12 includes low pressure compressor 18 and low pressure turbine 20, which are connected by low pressure shaft 22. High pressure spool 14 includes high pressure compressor 24 and high pressure turbine 26, which are connected by high pressure shaft 28. Fan drive gear system 16 includes epicyclic gear train 30 that drives a fan assembly 32 by way of a carrier shaft 34. Epicyclic gear train 30 includes sun gear 36, ring gear 38 and planetary gears 40 as will be shown hereinbelow. A carrier 50 is shown schematically in FIG. 4 between shaft 34 and ring gear 38. Details of this connection are better shown in FIG. 2.

Low pressure spool 12 and high pressure spool 14 are covered by engine nacelle 42, and fan assembly 32 and nacelle 42 are covered by fan nacelle 44. Low pressure spool 12, high pressure spool 14 and fan assembly 32 comprise a two-and-a-half spool gas turbine engine in which epicyclic gear train 30 couples fan assembly 32 to low pressure spool 12 with input shaft 46.

Fan assembly 32 generates bypass air for producing thrust that is directed between engine nacelle 42 and fan nacelle 44, and core air that is directed into engine nacelle 42 for sequential compression with low pressure compressor 18 and high pressure compressor 24. Compressed core air is routed to combustor 48 wherein it is mixed with fuel to sustain a combustion process. High energy gases generated in combustor 48 are used to turn high pressure turbine 26 and low pressure turbine 20. High pressure turbine 26 and low pressure turbine 20 rotate high pressure shaft 28 and low pressure shaft 22 to drive high pressure compressor 24 and low pressure compressor 18, respectively. Low pressure shaft 22 also drives input shaft 46, which connects to epicyclic gear train 30 to drive fan assembly 32.

Figure 2A:
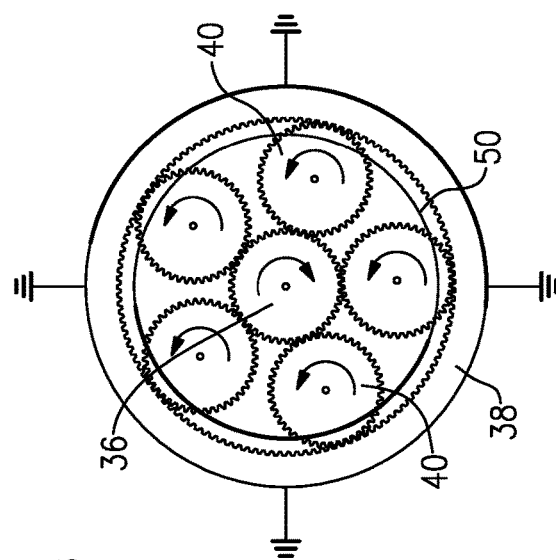
FIG. 2A is a sectional view through the gear drive.
Figure 2:
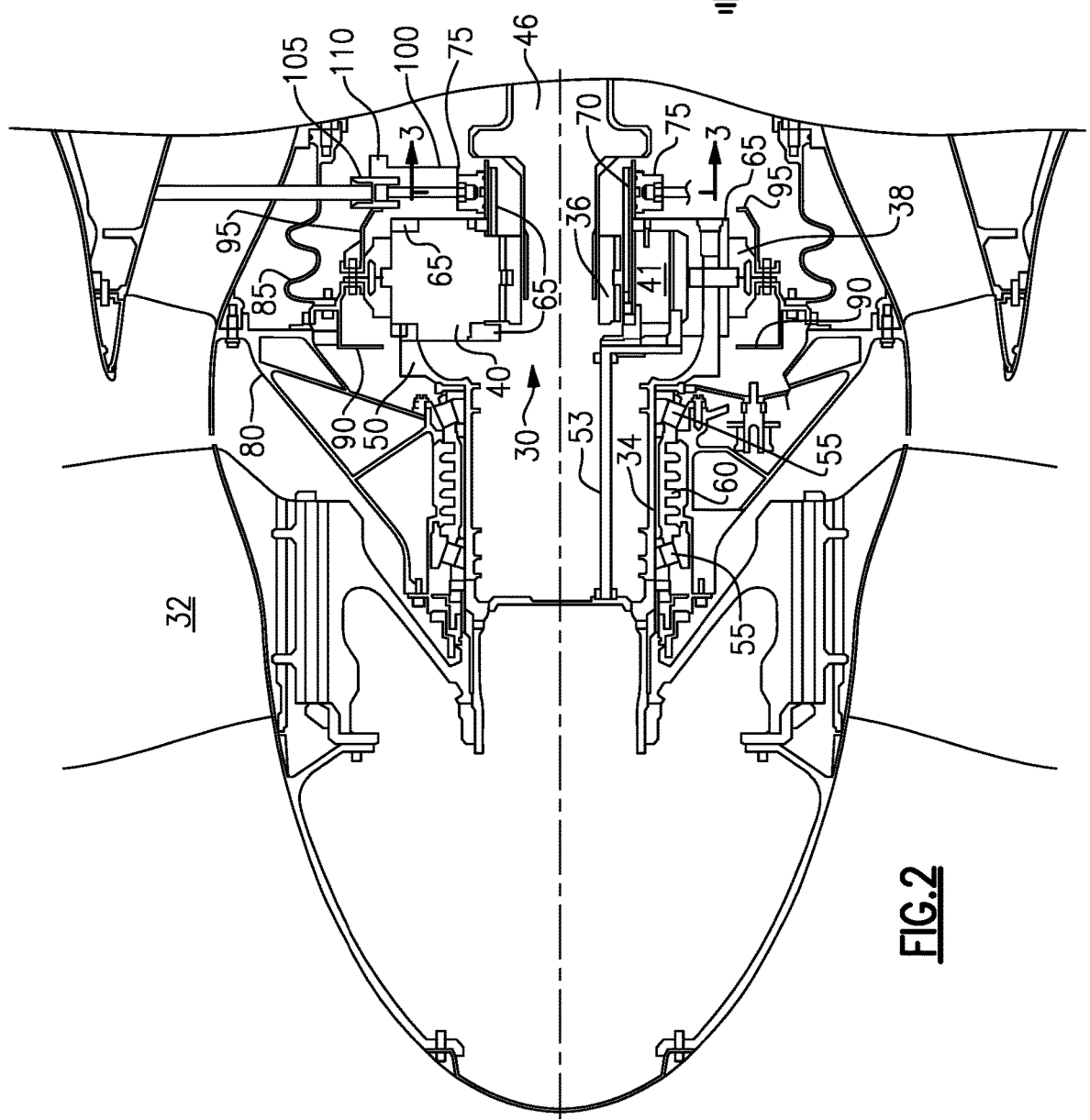
FIG. 2 is a sectional view taken along the lines 2-2 in FIG. 1.

Referring now to FIG. 2 and FIG. 2A, a view of the planetary gear system having exemplary oil supply system is shown. The system is comprised of an input shaft 46, sun gear 36 attaching thereto a plurality of planetary gears 40 that rotate about the sun gear 36, stationary ring gear 38, and a carrier 50 that rotates about the star gear to drive the fan assembly 32. As the ring gear 38 is stationary, the rotation of the sun gear 36 causes each planetary gear 40 to counter-rotate relative to the direction of rotation of the sun gear 36 and simultaneously to orbit the sun gear 36 in the direction of the sun gear's rotation. In other words, whereas each planetary gear 40 individually counter-rotates relative to the sun gear 36, the group of planetary gears 40 co-rotates with the sun gear 36. Moreover, as the carrier 50 is driven by the rotation of the group of planetary gears 40, the carrier 50 also co-rotates with respect to the sun gear 36. Finally, as the fan 32 is driven by the carrier 50 (via shaft 34), the fan 32 also co-rotates with respect to the sun gear 36 and the low spool shaft 46. Thus, in this embodiment, the fan 32 rotates in the same direction as the low pressure compressor 18.

A first spray bar 41 is mounted to the carrier 50 in between each planetary gear 40 that lubricates the planet gears 40 and ring gear 38. A second spray bar 53 is attached to the first spray bar 41 and extends forward to provide lubrication to the carrier shaft 34 that is supported by tapered bearings 55 that are tensioned by spring 60.

The carrier 50 has a shaft 34 for driving the fan assembly 32, a circular body 65 for holding the planetary gears 40 and a cylinder 70 projecting aft about the input shaft 46. The cylinder 70 also closely interacts with a stationary oil transfer bearing 75.

A grounding structure 80 holds the FDGS 16, the ring gear 38, forward gutter 90 and aft gutter 95. The flexible coupling 85 is disposed around the rotary input shaft 46. The forward gutter 90 and an aft gutter 95 attach to and around the outer edge of the ring gear 38 to collect oil used by the system for reuse as will be discussed herein. Oil is input through the stationary oil transfer bearing 75 to the cylinder 70 (e.g. also a bearing) as will be discussed herein.

Figure 3:
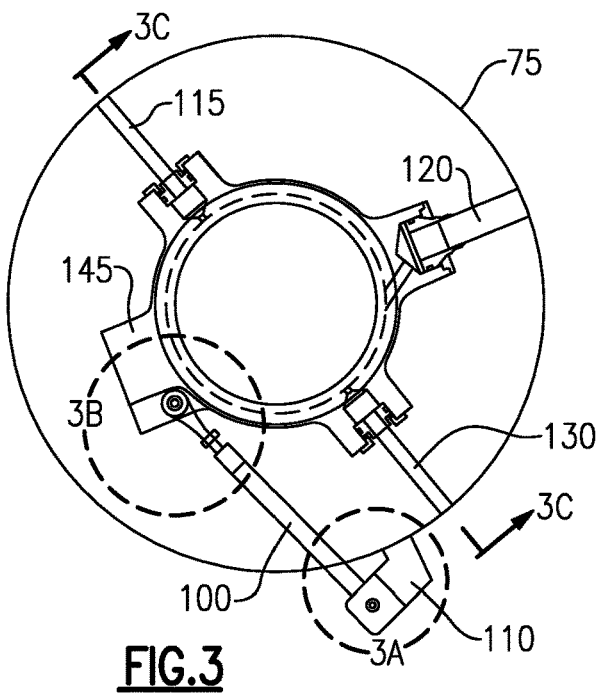
FIG. 3 is a sectional view taken along the lines 3-3.

Referring now to FIG. 3, a side, sectional view of the oil transfer bearing 75 is shown. The oil transfer bearing 75 is prevented from rotational movement by attachment of a link 100 via tab 110 to an oil input coupling 105 that attaches to the stationary aft gutter 95 (see also FIG. 2).

The oil transfer bearing 75 has a plurality of inputs to provide oil to those portions of the FDGS 16 that require lubrication during operation. For instance, oil from tube 115 is intended to lubricate the tapered bearings 55, oil from tube 120 is intended to lubricate the planet gear bearings 125 (see FIG. 5), and oil from tube 130 is intended to lubricate the planet and ring gears, 38, 40. Though three inputs are shown herein, other numbers of oil inputs are contemplated herein.

Figure 3A:
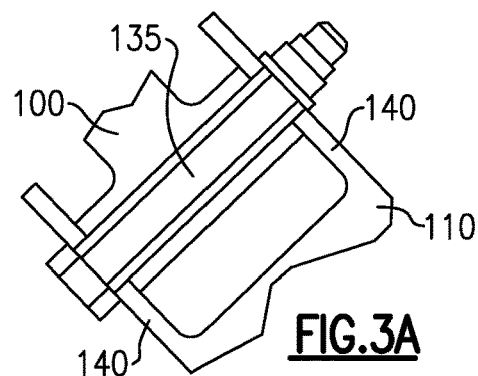
FIG. 3A is a sectional view taken along the line A-A of FIG. 3.
Figure 3B:
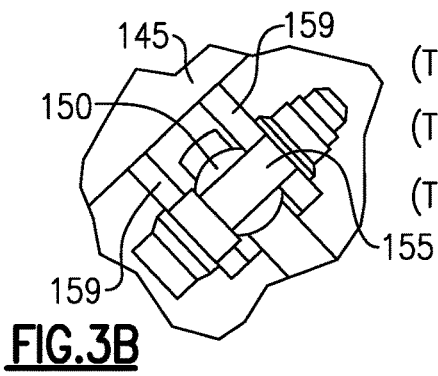
FIG. 3B is a sectional view taken along the line B-B of FIG. 3.

Referring now to FIGS. 3A and 3B, the link 100 attaches via a pin 135 to the ears 140 extending from the tab 110. The link 100 extends towards a boss 145 on the oil transfer bearing 75 and is attached thereto by a ball 150 and a pin 155 extending through the ball and a pair of ears 159 on the boss 145 on the oil transfer bearing 75. The ball 150 allows the oil transfer bearing 75 to flex with the rotary input shaft 46 as torqueing moments are experienced by the fan assembly 32 and other portions of the engine 10. The link 100 prevents the oil transfer bearing 75 from rotating while allowing it to flex.

Figure 3C:
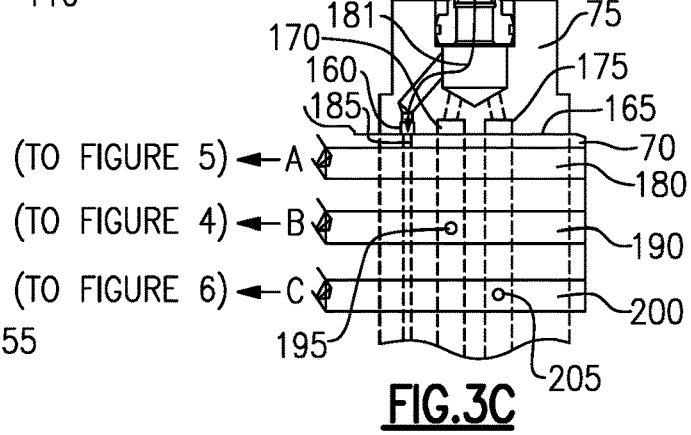
FIG. 3C is a sectional view taken along the line C-C FIG. 3.

Referring now to FIG. 3C, a cross-sectional view of the oil transfer bearing 75 is shown. The oil transfer bearing has a first race 160 that has a rectangular shape and extends around the interior surface 165 of the oil transfer bearing 75, a second race 170 that has a rectangular shape and extends around the interior surface 165 of the oil transfer bearing 75 and a third race 175 that has a rectangular shape and extends around the interior surface 165 of the oil transfer bearing 75. In the embodiment shown, tube 120 inputs oil via conduit 181 into the first race 160.

Cylinder 70 which extends from the carrier circular body 65, has a first oil conduit 180 extending axially therein and communicating with the first race 160 via opening 185, a second oil conduit 190 extending axially therein and communicating with the second race 170 via opening 195 and a third oil conduit 200 extending axially therein and communicating with the third race 175 via opening 205. As the cylinder 70 rotates within the oil transfer bearing 75, the openings 185, 195, 205 are constantly in alignment with races 160, 170, 175 respectively so that oil may flow across a rotating gap between the oil transfer bearing 75 and the cylinder 65 through the openings 185, 195, 205 to the conduits 180, 190, 200 to provide lubrication to the areas necessary in engine 10. As will be discussed herein, oil from conduit 180 flows through pathway A, oil from conduit 190 flows through pathway B and oil from conduit 200 flows through pathway C as will be shown herein.

Figure 4:
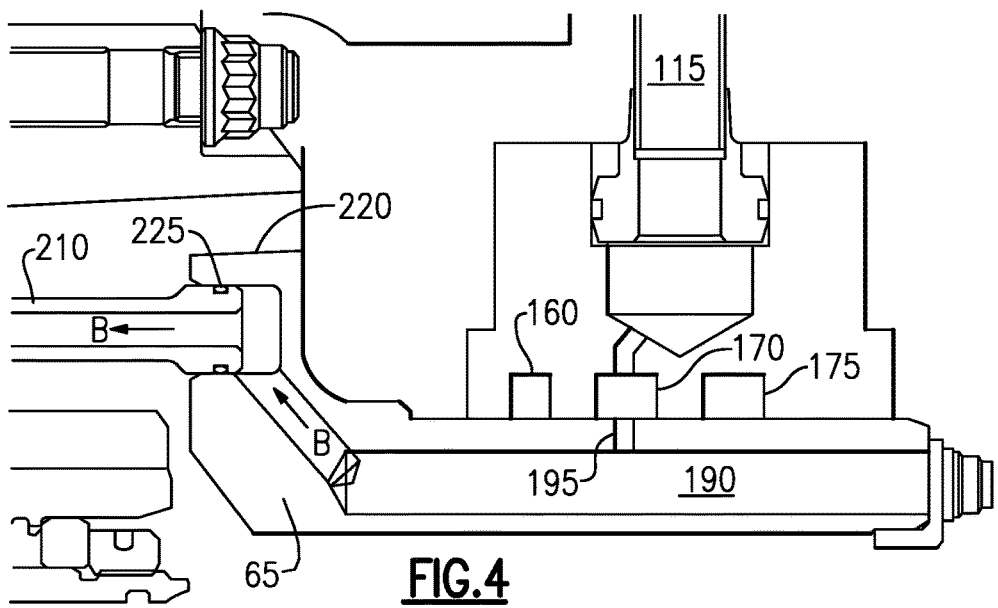
FIG. 4 is a sectional view of a portion of oil flow path A.
Figure 6:
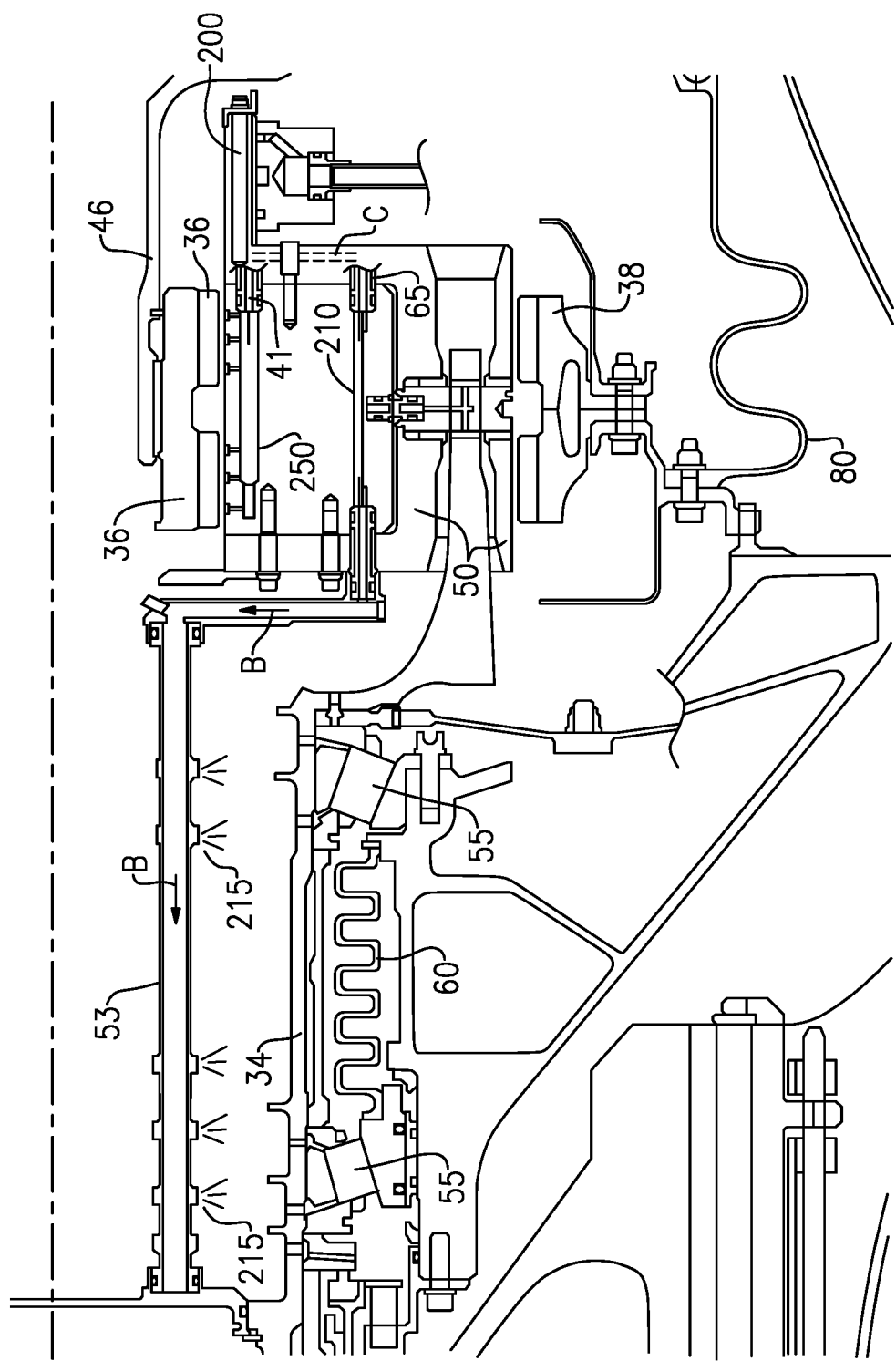
FIG. 6 is a sectional view of a lower portion of the planetary gear system of FIG. 1.

Referring now to FIGS. 4 and 6, oil from the tube 115 flows into second race 170, through opening 195 into conduit 190. From conduit 190, the oil flows through path B into a pipe 210 in the first spray bar 41 to the second spray bar 53 where it is dispersed through nozzles 215. Pipe 210 is mounted into fixtures 220 in the circular body 65 by o-rings 225 the oil FIG. 4, the journal oil bearing input passes through tube, and tube into transfers tubes through tube into the interior of each planetary gear. Each planetary gear has a pair of transverse tubes communicating with the interior of the planetary journal bearing to distribute oil between the planetary gear and the ring gear and a set of gears to provide lubricating area oil to the journal bearings 235 themselves.

Figure 5:
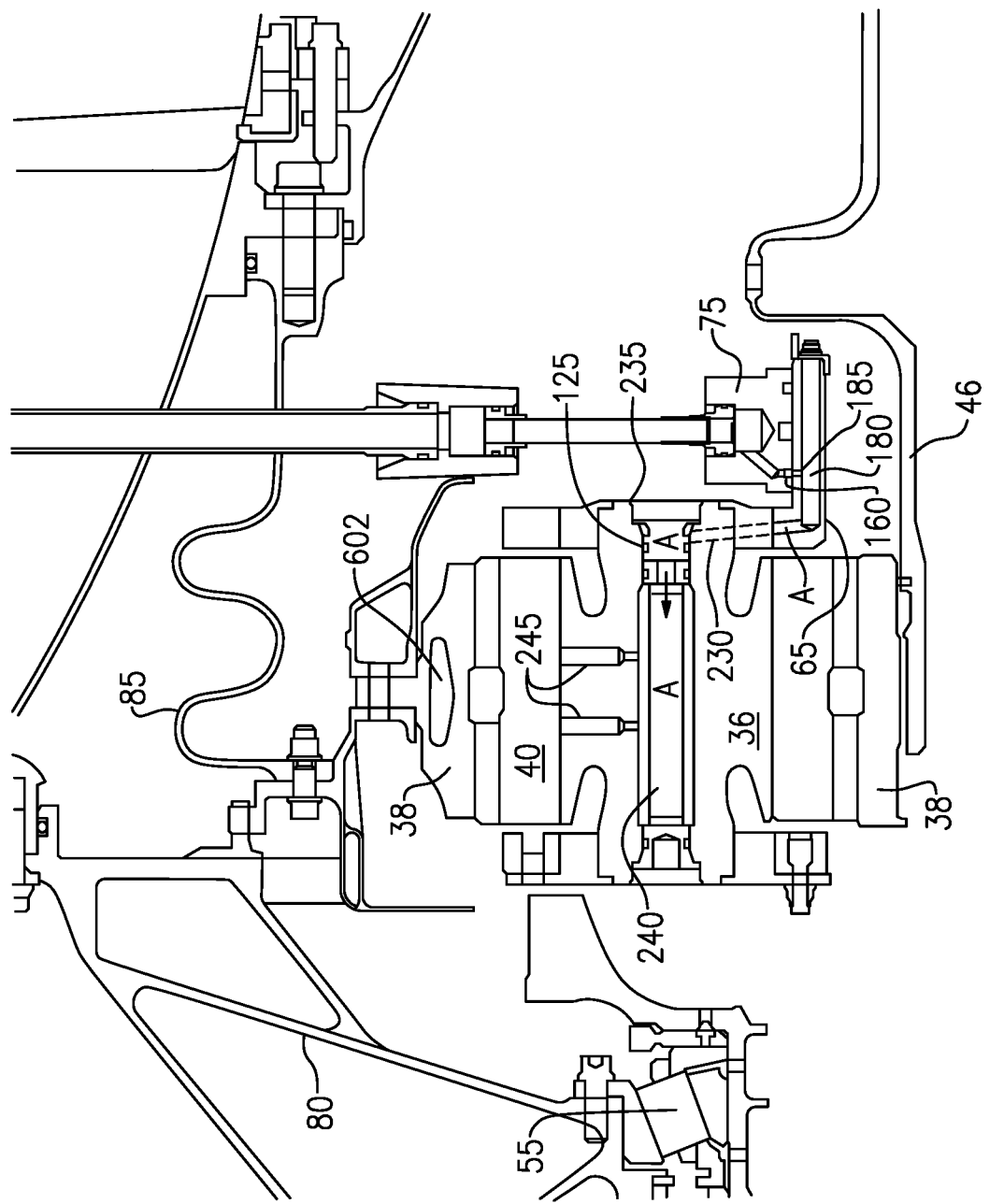
FIG. 5 is a sectional view of an upper portion of the planetary gear system of FIG. 1.

Referring now to FIGS. 3C and 5, the flow of oil through path A is shown. The oil leaves conduit 180 through tube 230 and flows around journal bearings 235 that support the planet gear 40 and into the interior of shaft 240. Oil then escapes from the shaft 240 through openings 245 to lubricate between the planetary gears 40 and the ring gear 38.

Referring to FIG. 6, the conduit 200 provides oil through pathway C into manifold 250 in the first spray bar 41 which sprays oil through nozzles 215 on the sun gear.

Figure 7:
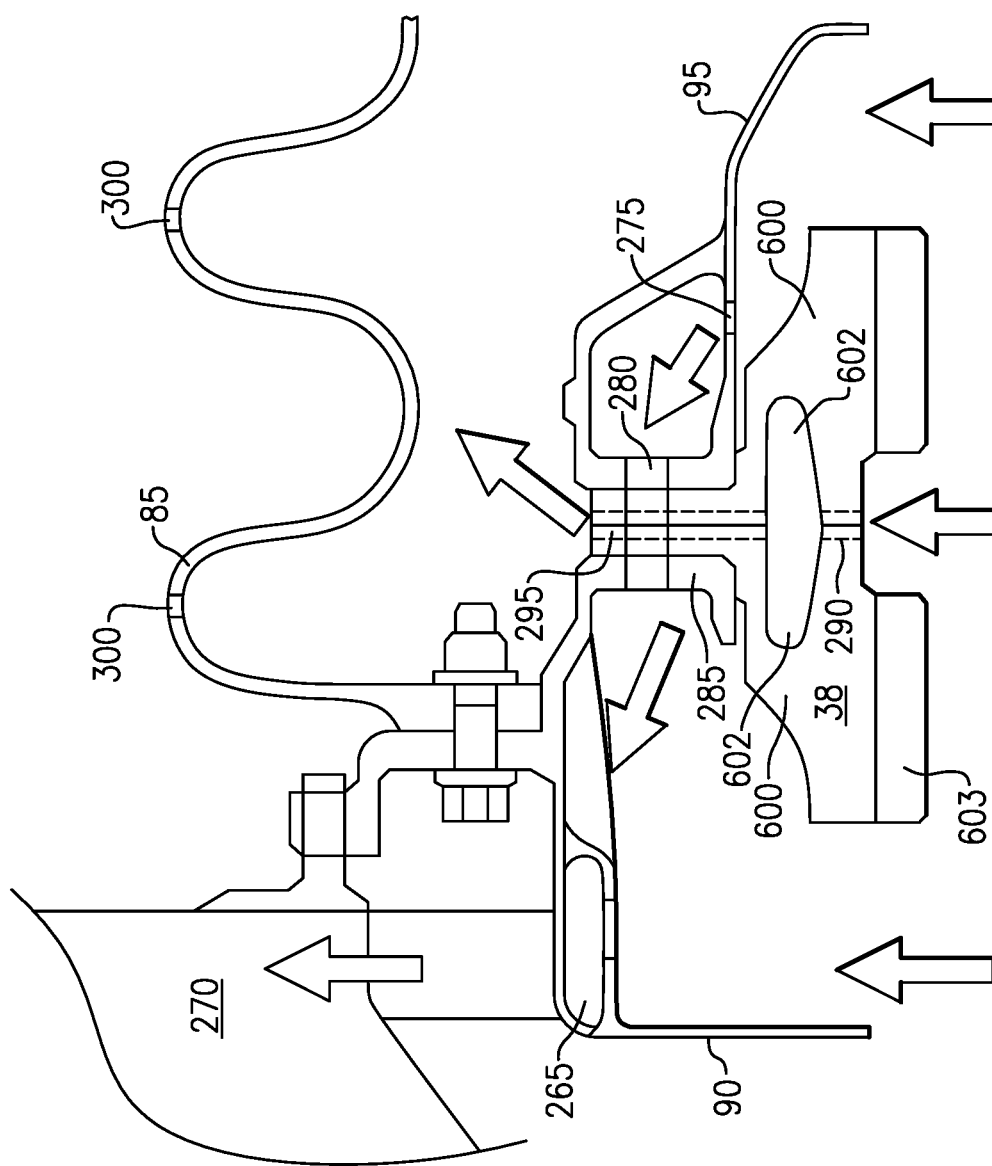
FIG. 7 is a sectional view of a flow of oil into gutters.

Referring now to FIG. 7, oil drips (see arrows) from the planetary gears 40 and the sun gear 36 about the carrier 50 and is trapped by the forward gutter 90 and the aft gutter 95. Oil captured by the forward gutter 90 is collected through scupper 265 for transport into an auxiliary oil tank 270. Similarly, oil captured by the aft gutter 95 travels through opening 275 and opening 280 in the ring gear support 285 into the forward gutter 90 to be similarly collected by the scupper 265 to go to the auxiliary oil tank 270. Some oil passes through openings 290, 295 within the ring gear 38 and drips upon the flexible coupling 85 and migrates through holes 300 therein and drains to the main scavenge area (not shown) for the engine 10.

As is clear from FIGS. 5 and 7, there is a recess adjacent the outer periphery of the ring gear 38. The recess identified by 602, can be seen to be formed by half-recess portions in each of two separate gear portions 600 which form the ring gear 38. As is clear, the recess 602 is radially outwardly of the gear teeth 603 on the ring gear 38. This recess helps balance force transmitted through the ring gear as the various interacting gear members shift orientation relative to each other.

Referring now to the Figures, In view of these shortcomings a simple, reliable, unlubricated coupling system for connecting components of an epicyclic gear train 30 to external devices while accommodating misalignment therebetween is sought.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of designing a gas turbine engine comprising:
configuring a speed reduction device for driving a fan assembly surrounded by an outer housing;
configuring a lubrication system for lubricating components across a rotation gap, the lubrication system including a lubricant input, a stationary first bearing receiving lubricant from said lubricant input and having a first race ire which lubricant flows, and a second bearing for rotation within said First bearing, said second bearing having a first opening in registration with said first race such that lubricant may flow from said first race through said first opening into a first conduit; and
configuring said first bearing to also include a second race into which lubricant flows, and said second bearing having a second opening in registration with said second race such that lubricant may flow from said second race through said second opening into a second conduit, with said first and second conduits delivering lubricant to distinct locations.

2. The method of claim 1, wherein said first bearing and said second bearing are centered about a common axis and said first conduit is parallel to said axis and said first opening is perpendicular to said axis.

3. The method of claim 2, wherein said speed reduction device includes a rotating carrier for supporting at least one planetary gear and said second bearing extends from said rotating carrier about said axis.

4. The method of claim 3, wherein said first conduit is parallel to said axis and said first opening is perpendicular to said axis and said first conduit lubricates said planetary gears.

5. The method of claim 3, further comprising a first spray bar disposed on said carrier.

6. The method of claim 1, wherein said speed reduction device includes an epicyclic gear train having a sun gear, a plurality of planetary gears configured to rotate about the sun gear, a stationary ring gear, and a carrier attached to said fan assembly.

* * * * *